Aug. 23, 1960 C. J. HIRSCH 2,950,053

ELECTRICAL INTEGRATOR

Filed Oct. 15, 1956 2 Sheets-Sheet 1

Aug. 23, 1960 C. J. HIRSCH 2,950,053

ELECTRICAL INTEGRATOR

Filed Oct. 15, 1956 2 Sheets-Sheet 2

United States Patent Office 2,950,053

Patented Aug. 23, 1960

2,950,053

ELECTRICAL INTEGRATOR

Charles J. Hirsch, Locust Valley, N.Y., assignor to Hazeltine Research, Inc., Chicago, Ill., a corporation of Illinois Filed Oct. 15, 1956, Ser. No. 616,056

14 Claims. (Cl. 235—183)

GENERAL

Figure 1:
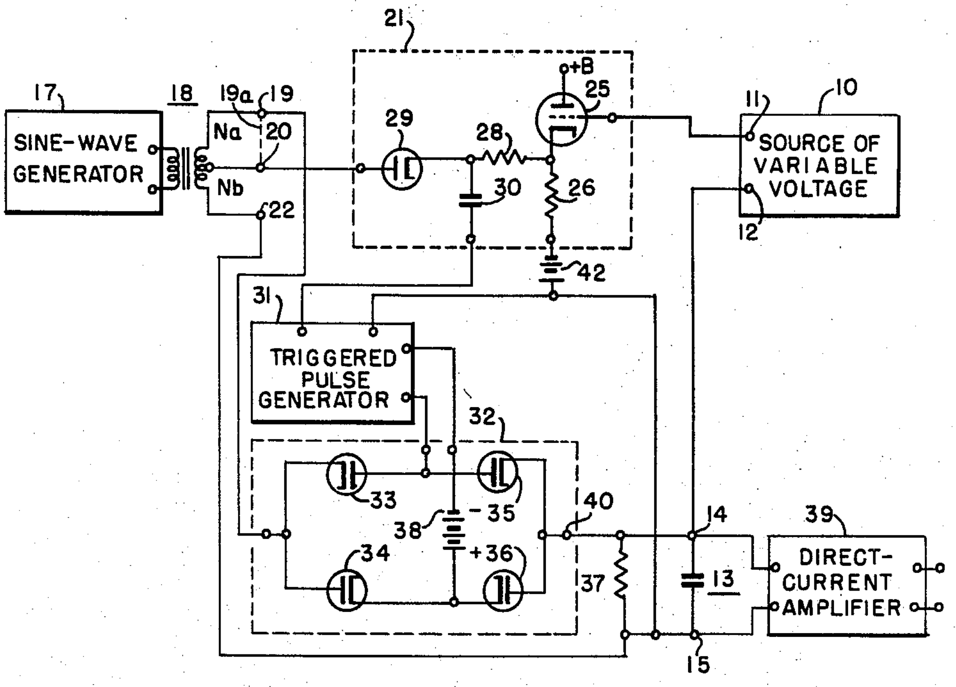

This invention relates to electrical computers for the solution of equations involving the operation of integration. The subject matter of this application is related to that of applicant's Patents Nos. 2,652,194, 2,666,576, and 2,671,608, all entitled, "Electrical Computer," and to a copending application Serial No. 616,057, entitled, "Electrical Differentiator."

One type of prior computer may be classified generally as an analogue computer. The operation of such analogue computers is continuous in nature so that such computers are useful with instruments, such as tachometer instruments, which develop a continuous type signal. Continuous type analogue computers heretofore employed to perform the mathematical operation of integration generally resort to direct-current feedback amplifiers having properly proportioned resistor-condenser networks in the feedback path and are further characterized by extremely high gains and large quantities of feedback. Such high-gain amplifiers, however, are relatively expensive and are subject to various disturbances.

The subject matter of applicant's Patent No. 2,671,608 relates to solving problems involving integration. The present invention is an improvement thereover and performs the foregoing operation in a simpler fashion and utilizes fewer and less complex components.

It is an object of the present invention, therefore, to provide a new and improved electrical integrator which avoids one or more of the limitations and disadvantages of prior integrators.

It is a further object of the invention to provide a new and improved electrical integrator which does not require mechanical moving parts, is compact and light in weight, yet is capable of making computations involving operation of integration at high speeds.

In accordance with the invention, an electrical integrator comprises means for supplying a periodic voltage and a source of a first voltage representing a function to be integrated. The integrator also includes a storage device for storing an integration voltage representing the integral of the aforesaid function and comparison means for instantaneously comparing the periodic voltage with the sum of the first and integration voltages. The integrator further includes a circuit actuated by the comparison means for instantaneously applying the aforesaid sum to the storage device each time the periodic voltage and the sum become equal during the cycle of the periodic voltage, all whereby the storage device progressively accumulates the integration voltage.

For a better understanding of the present invention, together with other and further objects thereof, reference is had to the following description taken in connection with the accompanying drawings, and its scope will be pointed out in the appended claims.

Figure 2A:
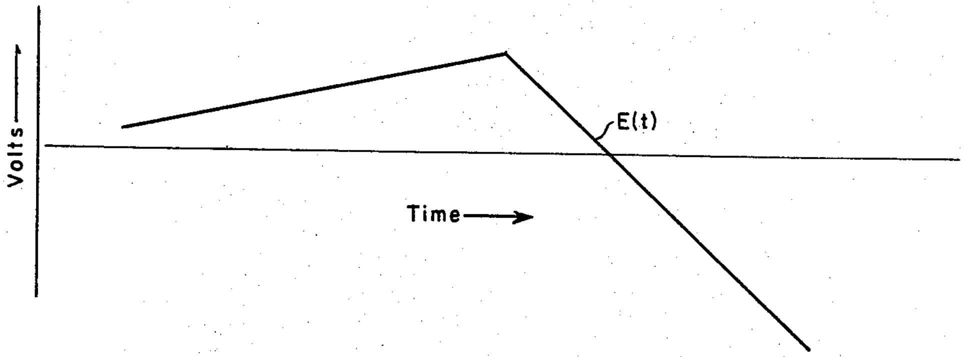
Figure 2B:
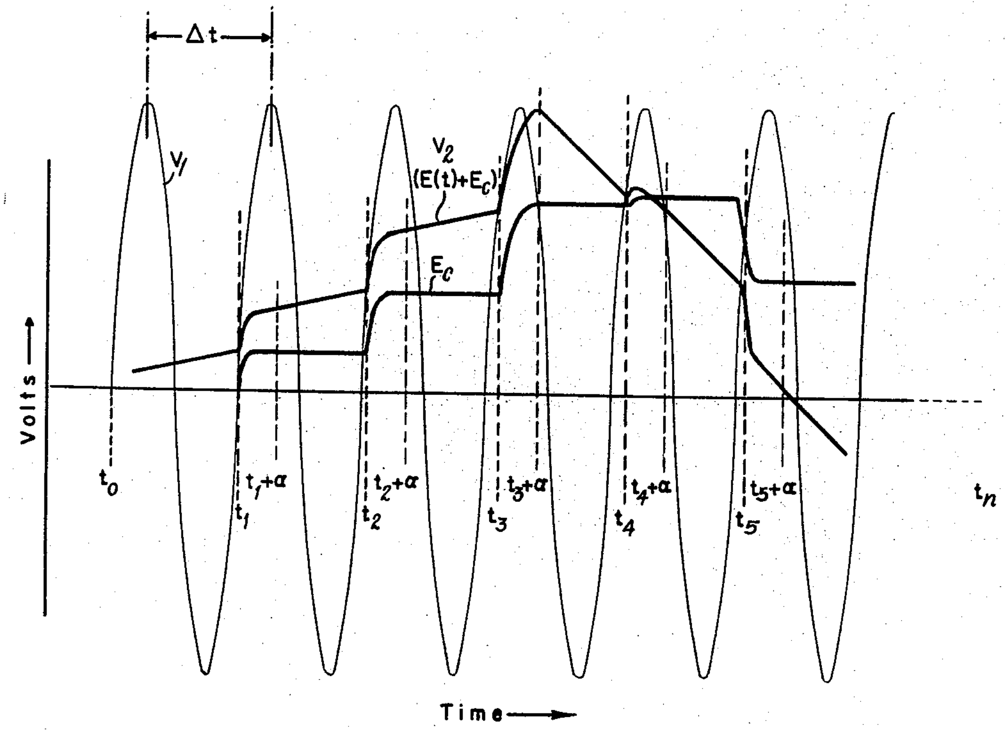

Referring to the drawings:

Fig. 1 is a circuit diagram, partly schematic, of an electrical integrator embodying the present invention in a particular form, and Figs. 2*a* and 2*b* represent curves useful in explaining the operation of the Fig. 1 embodiment.

*Description of Fig. 1 integrator*

Referring to Fig. 1 of the drawings, there is shown a circuit diagram of an electrical integrator. The integrator comprises a source of a first voltage representing a function to be integrated. Such source is represented by a source of variable voltage 10 and may comprise one of several simple electrical or electrical-mechanical arrangements. One simple arrangement would comprise a device for tracing the outline of a curve representing the variation of the variable parameter and a simple potentiometer and battery circuit for converting such variation into varying voltages.

The integrator also includes a storage device for storing an integration voltage representing the integral of the function. This storage device may comprise, for example, condenser 13. Terminal 14 of condenser 13 is connected to terminal 12 of source of variable voltage 10.

Additionally, the integrator includes a circuit for periodically and instantaneously adding the first and integration voltages and periodically applying the resultant sum to the storage device, whereby the storage device progressively accumulates the integration voltage. This circuit comprises elements now to be described. A sine-wave generator 17 is coupled to transformer 18. The output of transformer 18 is coupled to comparison circuit 21. Comparison circuit 21, in turn, is coupled to a triggered pulse generator 31 having an output coupled to sampling circuit 32. The output of sampling circuit 32 is coupled to a direct-current amplifier 39 in parallel with condenser 13.

The output of sine-wave generator 17 is connected to the primary winding of transformer 18 for translating a sinusoidal signal to the remaining circuits in the integrator. Transformer 18 represents a simple means, of many possible means, for supplying the sinusoidal signal to the integrator circuit. Comparison circuit 21 contains a tube 25 having a cathode load resistor 26 and a control electrode which are coupled to the series combination of the source of variable voltage 10 and condenser 13. Source of bias potential 42 in the cathode circuit of tube 25 acts to extend the effective range of tube 25 for negative input signals. The anode of the tube 25 is connected to a source of potential +B. The cathode of tube 25 is coupled through a resistor 28 to the cathode of tube 29, a diode rectifier. The anode of tube 29 is connected to terminal 20 of transformer 18. The cathode of tube 29 is also connected through condenser 30 to an input terminal of triggered pulse generator 31. Triggered pulse generator 31 may be a conventional blocking oscillator so that a detailed description thereof is unnecessary. If the output signal from comparison circuit 21 has insufficient magnitude, a pulse amplifier may be inserted between condenser 30 and the triggered pulse generator 31.

Sampling circuit 32 is of the bridge rectifier type and comprises four diode vacuum tubes 33, 34, 35, 36 arranged in a conventional bridge rectifier circuit. One pair of diagonal terminals of this bridge circuit is connected between terminal 19 of transformer 18 and terminal 40. The other pair of diagonal terminals of the bridge is connected to an actuating circuit comprising the series combination of the output terminals of triggered pulse generator 31 and a source of bias potential 38.

Direct-current amplifier 39 represents a means for utilizing the integration voltage. The input terminals of direct-current amplifier 39 are coupled to terminals 14 and 15 of condenser 13.

*Operation of Fig. 1 integrator*

The operation of the integrator just described will now be explained. For the integrator to operate, a signal is applied to the input terminals of transformer 18 from sine-wave generator 17. In most applications, a sinusoidal signal applied to transformer 18 will adequately operate this integrator. However, under certain conditions it may be desirable to use a periodic wave form other than a sinusoid. An output signal from terminal 20 of transformer 18 is applied to one of the inputs of comparison circuit 21. Simultaneously, the variable voltage source 10, representative of the variable parameter to be integrated, applies a signal to a second input of comparison circuit 21.

When the amplitude of the sinusoidal signal from terminal 20 and appearing on the anode of tube 29 becomes equal to the sum of the instantaneous value of the variable parameter and the voltage stored on the condenser 13 appearing on the cathode of tube 25, comparison circuit 21 develops a trigger signal which is applied through condenser 30 to triggered pulse generator 31. Triggered pulse generator 31 is activated and, in turn, develops an output pulse which is applied to sampling circuit 32. The pulse from generator 31 is of the proper polarity and magnitude to overcome the bias voltage developed by battery 38. Accordingly, the bridge circuit including tubes 33, 34, 35, and 36 is actuated and rendered conductive for the duration of the applied pulse with the result that the connection between terminal 19 and terminal 14 is completed. As a consequence, condenser 13 charges up substantially instantaneously to the instantaneous value of the sinusoidal signal at terminal 19. The maximum charging period is equal to the sampling period $\alpha$ and is made small enough so that both the variable parameter and the sinusoidal signal may be considered constant for the duration of the sampling period. In addition, the time constant developed by condenser 13 and the series impedance of sampling circuit 32, in a conductive state, is sufficiently small so that it is virtually ineffective in delaying the accumulation of voltage on condenser 13. At the conclusion of sampling period $\alpha$, determined by the duration of the pulse from triggered pulse generator 31, sampling circuit 32 is disabled, storing the newly accumulated voltage in condenser 13.

Condenser 13 need not be low in leakage as the charge is restored after each cycle and the loss between sampling periods may be compensated by charging condenser 13 with a voltage just enough greater to compensate for the leakage loss. Assuming condenser leakage, the voltage on condenser 13 will be lowered between sampling periods to:

$$E c \epsilon^{-t/RC} \tag{1}$$

after the time $t$. Time $t$ represents the interval between sampling periods, R denotes the leakage resistance of condenser 13 as represented by resistor 37, and C denotes the capacitance of condenser 13. $Ec$ represents the voltage to which the condenser is charged during the sampling period. Therefore, to compensate for the loss, the voltage applied to condenser 13 during the charging period can be increased by a factor K such that:

$$K\epsilon^{-t/RC}=1 \tag{2}$$

This is done by tapping the transformer as indicated in Fig. 1 where:

$$\frac{N_a+N_b}{N_b}=K \tag{3}$$

$N_a$ and $N_b$ denote the number of turns in the two portions of the transformer 18 secondary.

Where the leakage loss is extremely low, $N_a$ is made equal to zero and terminal 19 merges with terminal 20. For simplicity of explanation, hereafter it will be assumed that the signal applied to condenser 13 equals in amplitude the signal applied to comparison circuit 21 from terminal 20, that is, $N_a$ is zero and terminal 19 is directly connected to terminal 20 as indicated by dash line 19*a*.

At a subsequent time, corresponding to the next period of the sinusoidal signal, the amplitudes of the joint inputs to comparison circuit 21 are again equal, thereby establishing the required conditions for repeating the aforementioned cycle.

The manner in which the Fig. 1 computer is utilized to perform integration computations will be more fully apparent from the following mathematical analysis of its operation as explained with reference to the curves of Fig. 2*a* and Fig. 2*b*.

It is desired to have the computer solve the following operation:

$$Ey=\int_{t_a}^{t_b} E(t)\,dt \tag{4}$$

where E($t$) is a time-varying voltage.

The solution of Equation (4) may be approximated by:

$$Ey=(\Delta t)\sum_{t_b}^{t_a} E(t) \tag{5}$$

This approximation may be made as accurate as is desired by making successive $\Delta t$'s as small and as constant as possible, having it approach zero as in the conventional type of integration operation. Therefore, a computer can be made to measure the average of E($t$) for each $\Delta t$ period, sum all of the E($t$) values together, and multiply this result by $\Delta t$. Then the approximation of Equation 5 is established.

In the operation of the computer represented by Fig. 1 in solving an integration of the type presented by Equation (4), it is clear that the values of E($t$) and $\Delta t$ become the variable parameters of the equation, values of which can be represented by voltages or the position of mechanical linkages. Thus, the source of variable voltage 10 of Fig. 1 may represent the source of the variable parameter E($t$), providing instantaneous values of E($t$). One cycle of operation of the integrator represented by Fig. 1 may be made to be equal in time to $\Delta t$. Therefore, a value of E($t$) for each $\Delta t$ may be determined. In addition, by the operation of sampling circuit 32 and the retention of voltages in condenser 13, the sum of all the selected values of E($t$) for all of the intervals $\Delta t$ between $t_a$ and $t_b$ may be accumulated in condenser 13. Direct-current amplifier 39, through adjustment of its gain, may then be employed to multiple the sums of E($t$) stored in condenser 13 by a constant representative of $\Delta t$. In this fashion, a voltage is developed which is equal to the approximation of Equation 5 in the interval $t_a$—$t_b$.

The operation of summing the values of $E(t)$ may be clearly understood by referring to the curves of Figs. 2*a* and 2*b*. E($t$) in Fig. 2*a* represents an assumed variable parameter. It is understood, however, that any function may be used. As represented, E($t$) is the voltage appearing at terminal 11 of source of variable voltage 10 with respect to terminal 14 of condenser 13. The curve $V_1$ of Fig. 2*b* represents the sinusoidal signal derived from sine-wave generator 17 and appears at terminal 20 with respect to terminal 15 of condenser 13. The amplitude of $V_1$ must exceed $$\sum_{t=a}^{t=b} E(t)$$

the sum of the selected values of E($t$) in the interval $t_a$—$t_b$. In addition, the period $\Delta t$ between samplings established by the frequency of $V_1$ must be less than the time required for any substantial change in E($t$). Under the latter condition, E($t$) may be considered substantially linear during periods of $V_1$. Curve $E_c$ represents the voltage stored in condenser 13 as a function of time. The curve labeled $V_2$ represents the sum of the voltages E($t$) of Fig. 2$a$ and $E_c$ of Fig. 2$b$ as a function of time.

The summing operation will now be explained in detail. In the solution of some problems, a potential may initially be present across condenser 13 at time $t_0$. While the computer of Fig. 1 can function satisfactorily under these conditions, for simplicity of explanation, the voltage across condenser 13 at the start of the problem is assumed to be zero.

At time $t_0$, the voltage $V_1$ at terminal 20 starts to increase. At the instant $t_1$, $V_1$ is equal to the sum of $E(t_1)$ and $E_c$ where $E_c$ represents the voltage stored in condenser 13. This equality is detected by comparison circuit 21 which, in turn, enables sampling circuit 32 for a period $\delta t$. Sampling circuit 32 closes the connection between terminal 20 and terminal 14, impressing condenser 13 across terminals 20 and 22 of transformer 18. During the period $\delta t$, condenser 13 is charged by voltage $V_1=E_c+E(t_1)$. Since $E_c$ is zero in the interval $t_0$—$t_1$, condenser 13 acquires the voltage $E(t_1)$. This value is stored in condenser 13 by the disabling of sampling circuit 32 at the end of the sampling period $\alpha$. Voltage $V_1$ continues in a positive direction towards a maximum value and completes its cycle. The recovery characteristics of comparison circuit 21 in conjunction with triggered pulse generator 31 are adjusted to assure that only a single enabling signal to sampling circuit 32 is developed during a cycle of $V_1$. At a time $t_2$ during the next successive cycle of $V_1$, the amplitude of $V_1$ is equal to $E_c+E(t_2)=E(t_1)+E(t_2)$. This equality is detected by comparison circuit 21 which, in a manner heretofore discussed, causes condenser 13 to be impressed across terminals 20 and 22 of transformer 18. During this sampling period, condenser 13 charges to the value of $V_1$ at time $t_2$ or $E(t_1)+E(t_2)$ and this voltage is stored in condenser 13 when sampling circuit 32 is disabled. It is clear that successive cycles of operation of $V_1$ will result in charging condenser 13 as follows:

$$E_c=E(t_1)+E(t_2)+\ .\ .\ .\ +E(t_n) \qquad (6)$$

The voltage across condenser 13, $E_c$, is applied to direct-current amplifier 39 whose gain is adjusted to multiply $E_c$ by a constant proportional to $\Delta t$. The expression $E_c\Delta t$, where $E_c$ represents the summation in Equation 6, is very nearly equal to the summation $$\Delta t\sum_{t_b}^{t_a}E(t)$$

of Equation 5. An equality is not established because the durations of the successive intervals $\Delta t$ between sampling periods are not equal. The time at which a sampling period is initiated is related to the amplitude of E($t$) by virtue of the required finite rise time of voltage $V_1$. However, the difference in the $\Delta t$ intervals may be made as small as desired by making the voltage $V_1$ rise steeply. The accuracy of the computation by the present invention with respect to the integral of Equation 4 is further governed by the period of $V_1$. The period of $V_1$ must be less than the time required for a substantial change in value of E($t$) in order to obtain a representative sampling of every fluctuation in E($t$).

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electrical integrator comprising: means for supplying a periodic voltage; a source of a first voltage representing a function to be integrated; a storage device for storing an integration voltage representing the integral of said function; comparison means for instantaneously comparing the periodic voltage with the sum of the first and integration voltages; and a circuit actuated by the comparison means for instantaneously applying said sum to the storage device each time said periodic voltage and sum become equal during the cycle of the periodic voltage; all whereby the storage device progressively accumulates said integration voltage.

2. An electrical integrator comprising: means for supplying a periodic voltage; a source of a first voltage representing a function to be integrated; a condenser for storing an integration voltage representing the integral of said function; comparison means for instantaneously comparing the periodic voltage with the sum of the first and integration voltages; and a circuit actuated by the comparison means for instantaneously applying said sum to the condenser each time said periodic voltage and sum become equal during the cycle of the periodic voltage; all whereby the condenser progressively accumulates said integration voltage.

3. An electrical integrator comprising: means for supplying a periodic voltage; a source of a first voltage representing a function to be integrated; a storage device in series with the source for storing an integration voltage representing the integral of said function; comparison means for instantaneously comparing the periodic voltage with the sum of the first and integration voltages in series; and a circuit actuated by the comparison means for instantaneously applying said sum to the storage device each time said periodic voltage and sum become equal during the cycle of the periodic voltage; all whereby the storage device progressively accumulates said integration voltage.

4. An electrical integrator comprising: means for supplying a periodic voltage; a source of a first voltage representing a function of time to be integrated; a storage device for storing an integration voltage representing the integral with respect to time of said function; comparison means for instantaneously comparing the periodic voltage with the sum of the first and integration voltages; and a circuit actuated by the comparison means for instantaneously applying said sum to the storage device each time said periodic voltage and sum become equal during the cycle of the periodic voltage; all whereby the storage device progressively accumulates said integration voltage.

5. An electrical integrator comprising: means for supplying a periodic voltage; a source of a first voltage representing a function to be integrated; a storage device for storing an integration voltage representing the integral of said function; comparison means for instantaneously comparing the periodic voltage with the sum of the first and integration voltages; and a switch closed by the comparison means for instantaneously applying said sum to the storage device each time said periodic voltage and sum become equal during the cycle of the periodic voltage; all whereby the storage device progressively accumulates said integration voltage.

6. An electrical integrator comprising: means for supplying a periodic voltage; a source of a first voltage representing a function to be integrated; a condenser for storing an integration voltage representing the integral of said function; a comparator for instantaneously comparing the periodic voltage with the sum of the first and integration voltages; and a switching circuit actuated by the comparator for instantaneously applying said sum to the condenser each time said periodic voltage and sum become equal during the cycle of the periodic voltage; all whereby the condenser progressively accumulates said integration voltage.

7. An electrical integrator comprising: means for supplying a periodic voltage; a source of a first voltage representing a function to be integrated; a condenser in series with the source for storing an integration voltage representing the integral of said function; comparison means for instantaneously comparing the periodic voltage with the sum of the first and integration voltages in series; and a switching circuit actuated by the comparison means for instantaneously applying said sum to the condenser each time said periodic voltage and sum become equal during the cycle of the periodic voltage; all whereby the condenser progressively accumulates said integration voltage.

8. An electrical integrator comprising: means for supplying a periodic voltage; a source of a first voltage representing a function of time to be integrated; a condenser in series with the source for storing an integration voltage representing the integral with respect to time of said function; a comparator for instantaneously comparing the periodic voltage with the sum of the first and integration voltages in series; and a switch closed by the comparator for instantaneously applying said sum to the condenser each time said periodic voltage and sum become equal during the cycle of the periodic voltage; all whereby the condenser progressively accumulates said integration voltage.

9. An electrical integrator comprising: means for supplying a substantially periodic voltage; a source of first voltage representing a function to be integrated; a storage device for storing an integration voltage representing the integral of said function; comparison means for instantaneously comparing a first value of said substantially periodic voltage with the sum of the first voltage representing the function to be integrated and the integration voltage; and a circuit actuated by the comparison means for instantaneously applying a second value of said substantially periodic voltage to the storage device each time said first value of said substantially periodic voltage and said sum become equal during the cycle of the substantially periodic voltage; all whereby the storage device progressively accumulates said integration voltage.

10. An electrical integrator comprising: means for supplying a substantially periodic voltage; a source of first voltage representing a function to be integrated; a storage device for storing an integration voltage representing the integral of said function; comparison means for instantaneously comparing a first value of said substantially periodic voltage with the sum of the first voltage representing the function to be integrated and the integration voltage; and a circuit actuated by the comparison means for instantaneously applying a second and larger value of said substantially periodic voltage to the storage device each time said first value of said substantially periodic voltage and said sum become equal during the cycle of the substantially periodic voltage; all whereby the storage device progressively accumulates said integration voltage.

11. An electrical integrator comprising: means for supplying a substantially periodic voltage; a source of first voltage representing a function to be integrated; a storage device for storing an integration voltage representing the integral of said function; comparison means for instantaneously comparing a first value of said substantially periodic voltage with the sum of the first voltage representing the function to be integrated and the integration voltage; and a circuit actuated by the comparison means for instantaneously applying a second and larger value of said substantially periodic voltage to the storage device each time said first value of said substantially periodic voltage and said sum become equal during the cycle of the substantially periodic voltage, the difference between said first and said second values of said substantially periodic voltage compensating for leakage loss of said storage device; all whereby the storage device progressively accumulates said integration voltage.

12. An electrical integrator comprising: means for supplying a substantially periodic voltage; a source of a first voltage representing a function to be integrated; a storage device for storing an integration voltage representing the integral of said function; comparison means for instantaneously comparing the substantially periodic voltage with the sum of the first and integration voltages; and a circuit actuated by the comparison means for instantaneously applying said substantially periodic voltage to the storage device each time said substantially periodic voltage and sum become equal during the cycle of the substantially periodic voltage; all whereby the storage device progressively accumulates said integration voltage.

13. An electrical integrator comprising: means for supplying a substantially periodic voltage; a source of a first voltage representing a function to be integrated; a condenser for storing an integration voltage representing the integral of said function; comparison means for instantaneously comparing the substantially periodic voltage with the sum of the first and integration voltages; and a circuit actuated by the comparison means for instantaneously applying said substantially periodic voltage to the condenser each time said substantially periodic voltage and sum become equal during the cycle of the substantially periodic voltage; all whereby the condenser progressively accumulates said integration voltage.

14. An electrical integrator comprising: means for supplying a substantially periodic voltage; a source of a first voltage representing a function of time to be integrated; a storage device for storing an integration voltage representing the integral, with respect to time, of said function; comparison means for instantaneously comparing the substantially periodic voltage with the sum of the first and integration voltages; and a circuit actuated by the comparison means for instantaneously applying said substantially periodic voltage to the storage device each time said substantially periodic voltage and sum become equal during the cycle of the substantially periodic voltage; all whereby the storage device progressively accumulates said integration voltage.

References Cited in the file of this patent

UNITED STATES PATENTS

| | | |
|---|---|---|
| 2,671,608 | Hirsch | Mar. 9, 1954 |
| 2,789,761 | Merrill et al. | Apr. 23, 1957 |